No. 693,782. Patented Feb. 18, 1902.
H. H. BUFFUM.
ENGINE.
(Application filed Aug. 7, 1901.)
(No Model.)
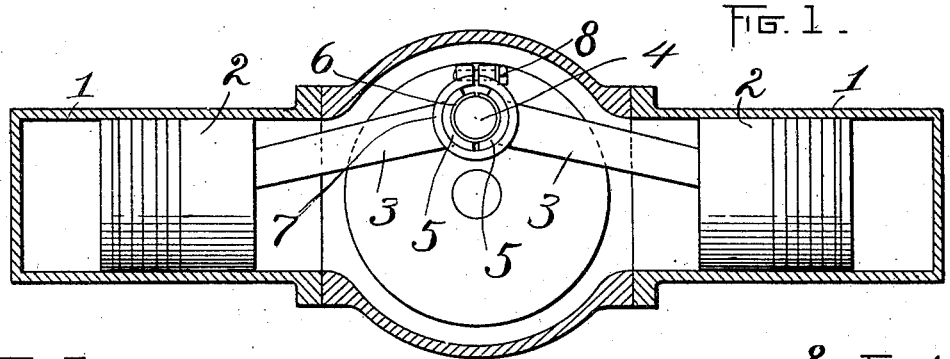
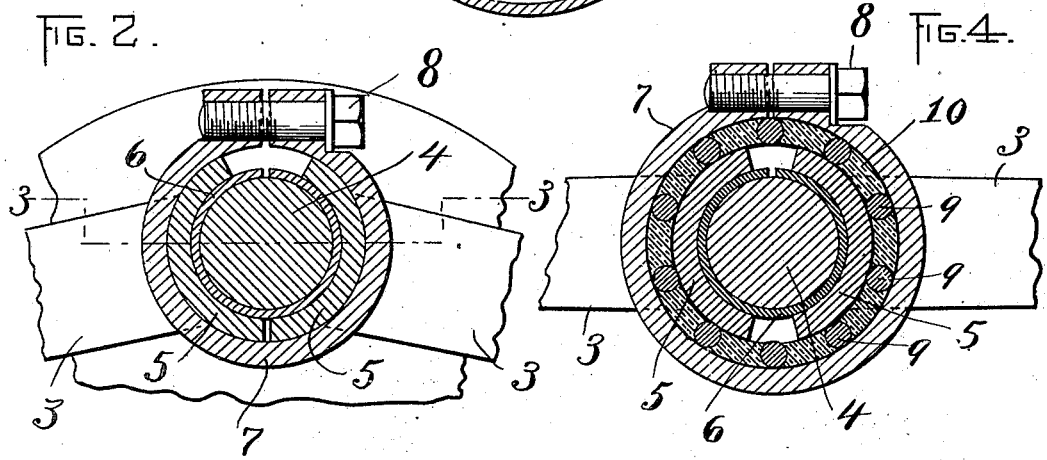
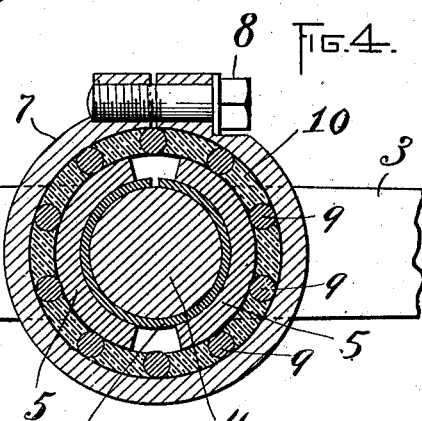
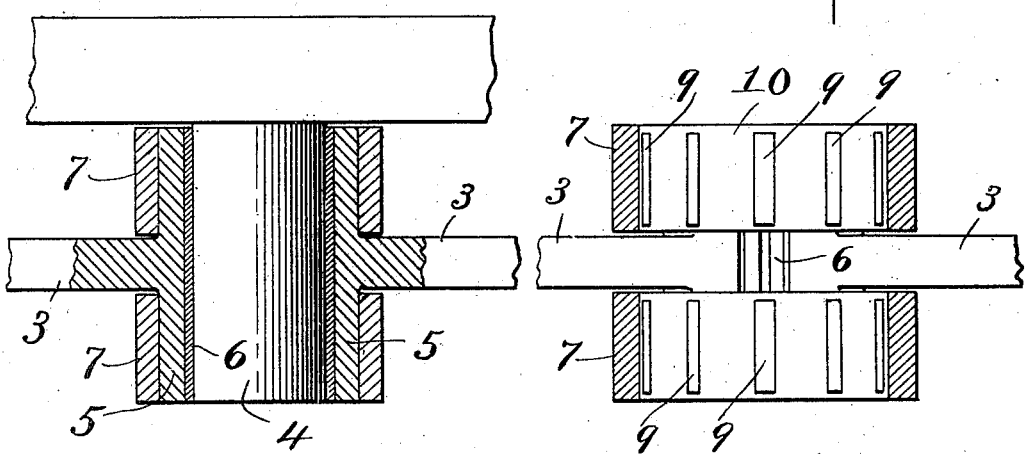
WITNESSES:
INVENTOR:
THE NORRIS PETERS CO., PHOTO-LITHO., WASHINGTON, D. C.

UNITED STATES PATENT OFFICE.

HERBERT H. BUFFUM, OF ABINGTON, MASSACHUSETTS.

ENGINE.

SPECIFICATION forming part of Letters Patent No. 693,782, dated February 18, 1902.

Application filed August 7, 1901. Serial No. 71,170. (No model.)

*To all whom it may concern:*

Be it known that I, HERBERT H. BUFFUM, of Abington, in the county of Plymouth and State of Massachusetts, have invented certain new and useful Improvements in Engines, of which the following is a specification.

This invention relates to reciprocating-piston motors, pumps, compressors, and other engines. Its object is to provide an improved form of crank-pin bearing whereby wear is reduced, compactness secured, and easy-running qualities obtained.

Of the accompanying drawings, Figure 1 represents an axial section of an engine provided with my improvements. Fig. 2 represents an enlarged detail transverse section of the crank-pin bearing. Fig. 3 represents a section in the line 3 3 of Fig. 2. Fig. 4 represents a transverse section through a modified form of crank-pin bearing. Fig. 5 represents a plan view thereof, partly in section.

The same reference characters indicate the same parts in all the figures.

Referring to the drawings, 1 1 represent the two opposed cylinders of a single-acting engine having pistons 2 2, which operate through pitmen or connecting-rods 3 3 on a single crank-pin 4. Instead of offsetting the crank-pin bearings on the ends of the pitmen, as is customary, I form the end of each with a segmental bearing-shoe 5, the two shoes being opposite each other or in the same zone as the crank-pin, and each may be, as shown, substantially as long as said pin. These shoes are separated by sufficient angular space to permit of the angular movements of the pitmen with respect to each other. Between the shoes 5 and the crank-pin is located a split annular bushing or collar 6, which practically wholly surrounds the crank-pin and is loose, so as to be capable of rotating with respect to either the shoes 5 or the crank-pin 4.

7 7 are split rings adjustable by means of bolts 8 8, surrounding the shoes 5 5 and serving to retain the pitmen in their proper relation to the crank-pin. I have found by experiment that the presence of the bushing 6 in a bearing of this character greatly decreases friction and that a bearing having the bushing will wear much longer and run easier than one without the bushing. The reason which I assign is that the bushing being free to turn with respect to either the crank-pin or the pitman-shoes will turn where there is the least friction and may turn with respect to both pin and shoe. The friction being distributed between two pairs of contacting surfaces for each pitman will naturally result in less wear and easier running.

I do not limit myself to any particular number of bushings. In practice I have found that two or three bushings will give a better result than a single bushing.

Since the thrust between the pitman-shoes 5 and the retaining-rings 7 is much less than that between the shoes and the crank-pin, I may employ antifriction-rollers 9 9 between said rings and shoes, as shown in Figs. 4 and 5, thereby permitting the rings to turn with respect to the shoes with great ease.

10 is a freely-movable roller-cage in which the rollers are mounted.

The invention is not limited to two pitmen, since a greater number may be employed, the bearing-shoes 5 being correspondingly shortened in angular extent.

Adjustment for wear in both of the illustrated constructions is effected by merely tightening the nuts 8. This contracts the rings 7, moves the bearing-shoes 5 radially inward, and contracts the bushing 6.

I claim—

In a crank-pin bearing, the combination of a crank-pin, a contractible bushing loosely surrounding the same, pitmen having segmental bearing portions embracing said bushing, a contractible retainer surrounding said bearing portions, and adjusting means for contracting the diameter of said retainer, the arrangement being such that the contraction of said retainer also effects the inward adjustment of the bearing-shoes and bushing with respect to the crank-pin.

In testimony whereof I have affixed my signature in presence of two subscribing witnesses.

HERBERT H. BUFFUM.

Witnesses:
R. M. PIERSON,
WILLIAM QUINBY.